(12) United States Patent
Ydoate et al.

(10) Patent No.: US 6,491,154 B2
(45) Date of Patent: Dec. 10, 2002

(54) UNSTACKER FOR UNSTACKING ITEMS CONVEYED IN A BULK STREAM

(75) Inventors: Edward Ydoate; Steven Vann Schroader; Jonathan D. Terrell, all of Louisville, KY (US)

(73) Assignee: Sandvik Sorting Systems, Inc., Louisville, KY (US)

( * ) Notice: Subject to any disclaimer, the term of this patent is extended or adjusted under 35 U.S.C. 154(b) by 0 days.

(21) Appl. No.: 09/745,449

(22) Filed: Dec. 26, 2000

(65) Prior Publication Data
US 2002/0079194 A1 Jun. 27, 2002

(51) Int. Cl.[7] .............................................. B65G 47/31
(52) U.S. Cl. ................. 198/461.3; 198/444; 198/460.1; 198/459.5
(58) Field of Search .............................. 198/444, 460.1, 198/461.3, 459.5; 414/797.6, 802

(56) References Cited

U.S. PATENT DOCUMENTS

| | | | |
|---|---|---|---|
| 2,006,870 A | | 7/1935 | Neuman |
| 3,730,386 A | * | 5/1973 | Monsees ........................ 221/7 |
| 3,837,469 A | * | 9/1974 | Kihnke ........................ 198/106 |
| 4,150,743 A | | 4/1979 | Lazzarotti et al. |
| 5,069,440 A | | 12/1991 | Lazzarotti et al. |
| 5,201,397 A | | 4/1993 | Isaacs |
| 5,282,613 A | * | 2/1994 | Standerfer et al. .......... 271/202 |
| 5,638,938 A | * | 6/1997 | Lazzarotti et al. .......... 198/445 |
| 5,697,753 A | * | 12/1997 | Aurora et al. ............... 414/398 |
| 5,860,504 A | * | 1/1999 | Lazzarotti ................... 198/357 |
| 6,171,051 B1 | * | 1/2001 | Hamers et al. .......... 414/797.6 |
| 6,259,967 B1 | * | 7/2001 | Hartlepp et al. ............ 700/230 |

FOREIGN PATENT DOCUMENTS

| | | |
|---|---|---|
| DE | 2 152 727 | 4/1973 |
| WO | WO87/02340 | 4/1987 |
| WO | WO99/03765 | 1/1999 |

* cited by examiner

Primary Examiner—Douglas Hess
(74) Attorney, Agent, or Firm—Burns, Doane, Swecker & Mathis, LLP (57) ABSTRACT

An unstacking apparatus includes a feed conveyor for feeding stacks of items, and a decline unstacking section including at least first and second declined conveyors arranged in series. A stack of items being transferred from the feed conveyor to the first declined conveyor tilts forwardly to cause the items to slide forwardly off one another into a shingle arrangement on the first declined conveyor. The second declined conveyor includes an upstream end which is offset upwardly relative to a downstream end of the first declined conveyor, causing items to travel upwardly in order to pass from the first to the second declined conveyors. The second declined conveyor travels at a faster speed than the first declined conveyor for at least partially de-shingling the items. A transfer conveyor conveys items to an incline unstacking section which includes at least first and second incline conveyors arranged in series. A stack of items being transferred from the transfer conveyor to the first inclined conveyor tilts rearwardly to cause the items to slide rearwardly off one another into a shingle arrangement on the first inclined conveyor. The second inclined conveyor includes an upstream end which is offset downwardly relative to a downstream end of the first inclined conveyor, causing items to descend in order to pass from the first to the second inclined conveyors. The second inclined conveyor travels at a faster speed than the first inclined conveyor for at least partially de-shingling the items.

30 Claims, 3 Drawing Sheets

UNSTACKER FOR UNSTACKING ITEMS CONVEYED IN A BULK STREAM

BACKGROUND OF THE INVENTION

The present invention relates to an unstacker and method for unstacking items being conveyed in a bulk stream.

The handing of items such as cartons, parcels, bundles, magazines, polybags, etc. often involves conveying the items in a bulk stream while stacked one upon the other. In order for the items to be properly handled, e.g., to redirect magazines to their intended destination, it may be necessary to first destack the items.

Various ways of unstacking items have been proposed, e.g., see the disclosures of U.S. Pat. Nos. 2,006,870; 4,150,743; 5,069,440; and 5,201,397. U.S. Pat. No. 2,006,870 describes a decline unstacker for unstacking bundles of sugar being conveyed in stacks along a horizontal flight of an endless conveyor. The horizontal flight transforms into a declined flight, causing the top items to slide off the bottom items and onto a declined chute. At the bottom of the chute a rapidly moving horizontal endless conveyor pulls the items successively away. Among the problems occurring in connection with such a decline unstacker is that the bottom bundles may form a continuous line of bundles along the declined flight of the feed conveyor and the chute, whereby the top bundles simply slide upon that line of bundles without ever becoming unstacked.

It is, therefore, an object of the invention to provide an unstacker and method which minimizes or obviates those and other problems.

SUMMARY OF THE INVENTION

The present invention relates to a decline unstacking apparatus and an incline unstacking apparatus which can be combined in series, or utilized separately.

The decline unstacking apparatus comprises a feed conveyor for feeding stacks of items, and a declined conveyor arrangement including at least first and second declined conveyors arranged in series. A first of the declined conveyors has an upstream end disposed at a discharge end of the feed conveyor. The first declined conveyor is declined at an angle relative to a direction of travel of the feed conveyor whereby items in a stack being discharged from the feed conveyor tilts to cause the items in the stack to slide off one another into a shingle arrangement on the first declined conveyor. The second declined conveyor includes an upstream end disposed adjacent a downstream end of the first declined conveyor and traveling at a faster speed than the first declined conveyor, whereby the second declined conveyor tends to separate the items received from the first declined conveyor.

Preferably, a sensor is provided for sensing items on the first declined conveyor. A controller is provided for controlling a speed of the feed conveyor in response to signals from the sensor, for preventing a discharge of additional items onto the first declined conveyor until there is space on the first declined conveyor for receiving additional items.

An upstream end of a conveying surface defined by the second declined conveyor is preferably offset upwardly with respect to a path of travel of the downstream end of a conveying surface defined by the first declined conveyor, causing a leading end of each item to be raised when passing from the first declined conveyor to the second declined conveyor.

Another aspect of the invention relates to a method of unstacking items fed in stacked relationship in a bulk stream. The method comprises the steps of:

A) feeding the stream along a feed conveyor to an upstream end of a declined conveyor arrangement which comprises at least first and second declined conveyors arranged in series, whereby a stack of items tilts as it reaches an upstream end of the first declined conveyor, causing the items to slide off one another into a shingle arrangement on the first declined conveyor; and B) driving the second declined conveyor at a faster speed than the first declined conveyor whereby the second declined conveyor tends to separate the items received from the first declined conveyor.

Preferably, the method includes the steps of sensing items on the first declined conveyor, and regulating a speed of the feed conveyor in response to signals from the sensor, to prevent the discharge of additional items to the first declined conveyor until there is space on the first declined conveyor for receiving additional items.

The incline unstacking apparatus comprises a feed conveyor for feeding stacks of items, and an inclined conveyor arrangement including at least first and second inclined conveyors arranged in series. A first of the inclined conveyors has an upstream end disposed at a discharge end of the feed conveyor. The first inclined conveyor is inclined at an angle relative to a direction of travel of the feed conveyor whereby items in a stack being discharged from the feed conveyor tilts rearwardly to cause the items in the stack to slide rearwardly off one another into a shingle arrangement on the first inclined conveyor. The second inclined conveyor includes an upstream end disposed adjacent a downstream end of the first inclined conveyor and traveling at a faster speed than the first inclined conveyor, whereby the second inclined conveyor tends to separate the items received from the first inclined conveyor.

Preferably, a sensor is provided for sensing items on the first inclined conveyor. A controller is provided for controlling a speed of the feed conveyor in response to signals from the sensor, for preventing a discharge of additional items onto the first inclined conveyor until there is space on the first inclined conveyor for receiving additional items.

An upstream end of a conveying surface defined by the second inclined conveyor is preferably offset downwardly with respect to a path of travel of the downstream end of a conveying surface defined by the first inclined conveyor, causing a leading end of each item to descend when passing from the first inclined conveyor to the second inclined conveyor.

Another aspect of the invention relates to a method of unstacking items fed in stacked relationship in a bulk stream. The method comprises the steps of:

A) feeding the stream along a feed conveyor to an upstream end of an inclined conveyor arrangement which comprises at least first and second inclined conveyors arranged in series, whereby a stack of items tilts rearwardly as it reaches an upstream end of the first inclined conveyor, causing the items to slide rearwardly off one another into a shingle arrangement on the first inclined conveyor; and B) driving the second inclined conveyor at a faster speed than the first inclined conveyor whereby the second inclined conveyor tends to separate the items received from the first inclined conveyor.

Preferably, the method includes the steps of sensing items on the first inclined conveyor, and regulating a speed of the feed conveyor in response to signals from the sensor, to prevent the discharge of additional items to the first inclined conveyor until there is space on the first inclined conveyor for receiving additional items.

BRIEF DESCRIPTION OF THE DRAWINGS

The objects and advantages of the invention will become apparent from the following detailed description of a preferred embodiment thereof in connection with the accompanying drawings in which like numerals designate like elements and in which.

DETAILED DESCRIPTION OF A PREFERRED EMBODIMENT OF THE INVENTION

Figure 1:
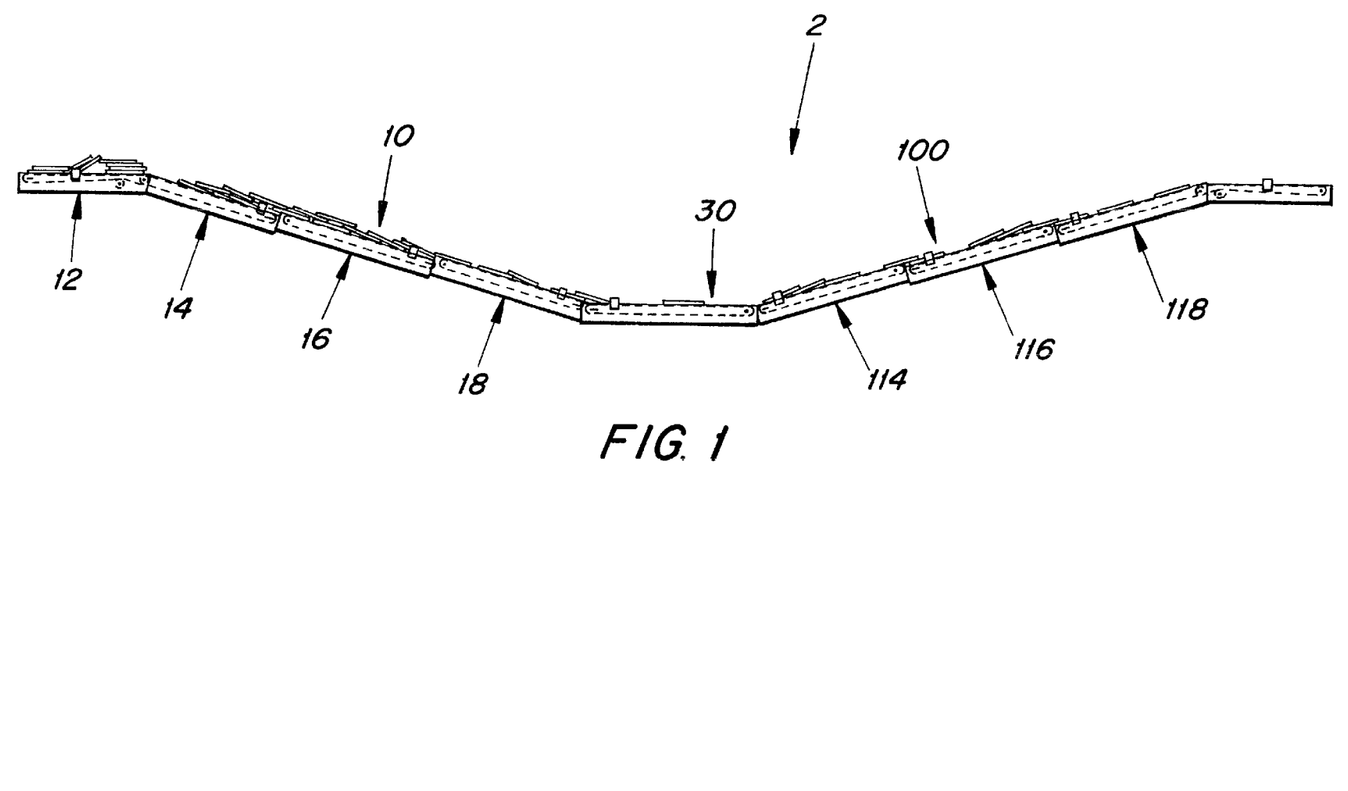
FIG. 1 is a side elevational view of a decline-incline unstacker according to the present invention.

Depicted in FIG. 1 is a decline-incline unstacker 2 according to the present invention. The unstacker 2 includes a decline section 10 and an incline section 100 interconnected by a transfer conveyor 30. The unstacker 2 functions to convert a 3-dimensional bulk stream of goods into a 2-dimensional stream, by unstacking and separating the items. Such items may include cartons, parcels, bundles, magazines, envelopes, polybags, etc.

The decline section 10 could be used with or without the incline section 100 and the same is true of the incline conveyor section 100. In one preferred embodiment, both sections 10, 100 are used together so that items which may remain in a stacked condition upon exiting the decline section 10 will be unstacked in the incline section 100.

Decline Unstacker

Figures 2, 3:
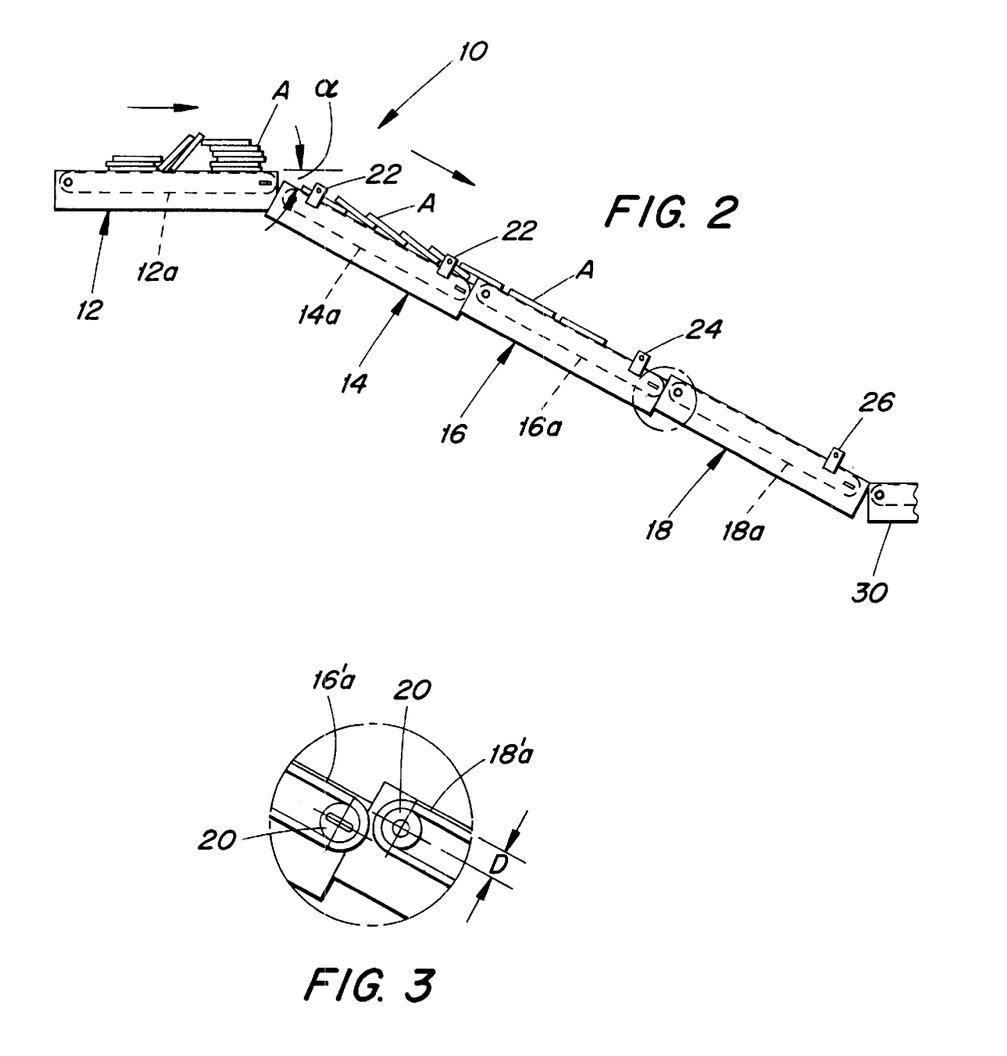
FIG. 2 is a side elevational view of the decline unstacker section of FIG. 1.
FIG. 3 is an enlarged view of an encircled portion of FIG. 2 showing the positional relationship between two declined conveyors.

The decline unstacking section 10 comprises a feed conveyor assembly 12 and a declined conveyor arrangement which includes two or more declined conveyor assemblies 14, 16, 18. Those assemblies include respective conveyors 14a, 16a, and 18a shown as conveying a bulk stream of items A, at least some of which are in stacked relationship. The feed conveyor assembly includes a conveyor 12a which conveys the items in a horizontal direction to an upstream end of a first of the declined conveyors 14a.

The conveyors 12a, 14a, 16a, 18a are driven by respective variable speed motors, (not shown), the speeds being regulated by a controller (not shown). The conveyors could be of any suitable type, such as belts or rollers for example, but preferably are in the form of endless belts each extending around a pair of rotatable pulleys 20. One of the pulleys associated with each belt is driven by the motor.

Each of the declined conveyors forms a conveying surface upon which the items ride. In the case of an endless belt type of conveyor, the conveying surface is formed by the upper flight of the belt. Importantly, the conveying surfaces have a higher coefficient of friction than the outer faces of the items A. For example, the belts could be formed of rubber, urethane or PVC.

Except for the first declined conveyor 14a, each of the declined conveyors 16a, 18a has an upstream end of its conveying surface offset upwardly by a distance D with respect to a downstream end of the conveying surface of the preceding conveyor, i.e., offset in a direction requiring that the front or leading edge of each item A be raised relative to its rear or trailing edge as the item is being transferred from the preceding conveyor to the succeeding conveyor, to facilitate separation of the items as will be discussed.

The magnitude of the offset distance D can vary, although one preferred distance is equal to the radius of the downstream pulley.

The first declined conveyor assembly 14 includes an infeed sensor 22 located adjacent an upstream end of the respective conveyor 14a for detecting the presence of items. That infeed sensor 22 is connected to the conveyor speed controller for providing a signal that controls the speed of the feed conveyor 12a as will be explained. The infeed sensor 22 could be of any suitable type, such as a photocell for example.

The angle of declination of the conveying surface of the first declined conveyor 14a is chosen so that the items being conveyed will slide on top of each other but will not slide on the conveying surface. The optimum size of the angle will depend on the coefficient of friction of the outer surface of the items A, but will usually lie in the range of 20–40 degrees. The conveying surfaces of the remaining declined conveyors 16a, 18a are preferably, but not necessarily parallel to the conveying surface of the first declined conveyor 14.

The general speed relationship of the declined conveyors is such that each declined conveyor travels faster than the preceding declined conveyor. For lower throughputs the relative conveying speeds could be fixed.

For higher throughputs, the relative conveying speeds could be variable, and controlled by a programmable logic device such as a PC or PLC. Each conveyor would then include a sensor 22b, 24b, 26b located near the downstream end thereof to check for the presence of items A. If items A are detected by a sensor 22b, 24b, 26b, then the speed of the respective conveyor would be set to a fraction of the speed of the next downstream conveyor. In this way, the speed would always be increasing for each consecutive belt in the series. This speed-increasing feature is utilized to pull the items apart (i.e., de-shingle the items) as they transfer from one conveyor to the next. For best functionality, a speed ratio of at least 2:1 is desired between consecutive conveyors. Typical speeds for the conveyors 14a, 16a, 18a would be 10, 20 and 40 feet per minute, respectively.

Likewise, the speed of the last declined conveyor 18a is determined by the speed of the transfer conveyor 30 located immediately downstream from the declined conveyor arrangement. In order to avoid the possibility of restacking the items, the last declined conveyor should operate at a speed no greater than that of the transfer conveyor 30.

If no items are detected by sensors 22b, 24b, 26b, the declined conveyors would then run at a maximum design speed. This maximizes the throughput by closing gaps in the item flow stream.

In operation, identical items A (e.g., magazines) are conveyed in a bulk stream on the feed conveyor 12a, at least some of the items being arranged in stacks. As a stack transfers onto the upstream end of the first declined conveyor 14a, the stack will tilt forwardly, causing the items to tend to slide forwardly off one another and eventually assume a shingle orientation on the high-friction first declined conveyor 14a, or possibly on one of the subsequent declined conveyors, depending on the density of items being conveyed. In this shingle orientation, the leading end of an item is disposed beneath the trailing end of a preceding item. Due to the high-friction of the conveying surface, the items will stay where they land on the conveying surface, but items disposed atop another item will continue to slide downwardly, thereby creating the shingle orientation.

It may be necessary to stop, or slow down, the feed conveyor 12a to prevent the discharging of additional items upon the shingled items that were previously discharged, in order to avoid a re-stacking of items on the first declined conveyor 14a. As long as the infeed sensor 22a senses the presence of items, it will send a signal to the controller for stopping or slowing the feed conveyor 12a. Once the infeed sensor 22a no longer senses items, the feed conveyor 12a will resume its normal speed.

As each item A reaches the second declined conveyor 16a, its leading edge will be raised, due to the upwardly offset relationship of the conveying surface of the second declined conveyor 16a relative to that of the first declined conveyor 14a. This will free any loose debris, such as paperclips, staples, rubber bands, etc., trapped beneath the items, enabling the debris to fall through a gap disposed between the conveyors 14a, 16a.

Also, the raising of an item's leading edge brings the underside of the item into surface contact with the high-friction second declined conveyor 16a. Since the item's trailing edge still rests on the low-friction item trailing therebehind, and since the downstream conveyor 16a is traveling faster than (e.g., twice as fast as) the upstream conveyor 14a, the leading item is pulled forwardly relative to the trailing item. Depending upon the magnitude of the speed difference, the leading item can be completely or partially pulled off the trailing item. If only partially pulled off the trailing item, the leading item will be further separated from the trailing item by subsequent one(s) 18 of the declined conveyors until completely separated from the trailing item.

As noted earlier, in a situation where a high volume of items is being conveyed, it may be desired to slow the speeds of the declined conveyors by using the sensors 22b, 24b, 26b. If those sensors detect items, then the speed of the respective conveyor would be reduced, as well as the speeds of all conveyors disposed downstream thereof, while maintaining the relationship wherein the speed of each downstream conveyor is greater than the speed of the previous conveyor.

If a sensor 22b, 24b, or 26b does not detect items, then the conveyor speeds return to their maximums, but wherein each declined conveyor travels faster than the previous declined conveyor.

It will be appreciated that the decline unstacker according to the invention provides an effective way of unstacking items while ensuring that no re-stacking will occur.

Incline Unstacker

Figure 4:
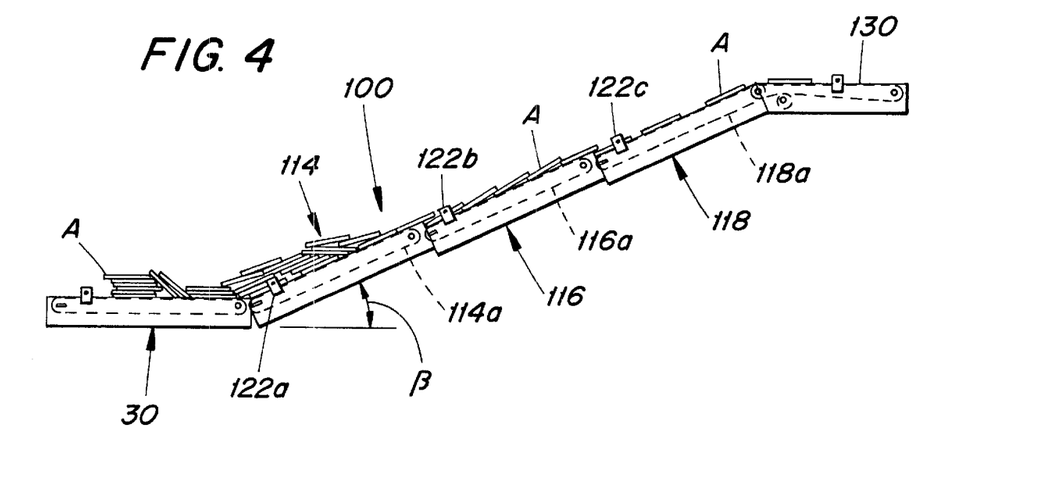
FIG. 4 is a side elevational view of the incline unstacker section of FIG. 1.

The incline unstacker 100 comprises multiple inclined conveyor assemblies 114, 116, 118. Those assemblies include respective conveyors 114a, 116a, and 118a shown as conveying a bulk stream of items A, at least some of which are in stacked relationship. The transfer conveyor 30 conveys the items in a horizontal direction to an upstream end of a first of the declined conveyors 114a, and thus constitutes a feed conveyor for the incline section 100.

The conveyors 114a, 116a, 118a are driven by respective variable speed motors, (not shown), the speeds being regulated by a controller (not shown). The conveyors could be of any suitable type, such as belts or rollers for example, but preferably are in the form of endless belts each extending around a pair of rotatable pulleys 120. One of the pulleys associated with each belt is driven by the motor.

Each of the inclined conveyors forms a conveying surface upon which 10 the items ride. In the case of an endless belt type of conveyor, the conveying surface is formed by the upper flight of the belt. Importantly, the conveying surfaces have a higher coefficient of friction than the outer faces of the items A. For example, the belts could be formed of rubber, urethane or PVC.

Figure 5:
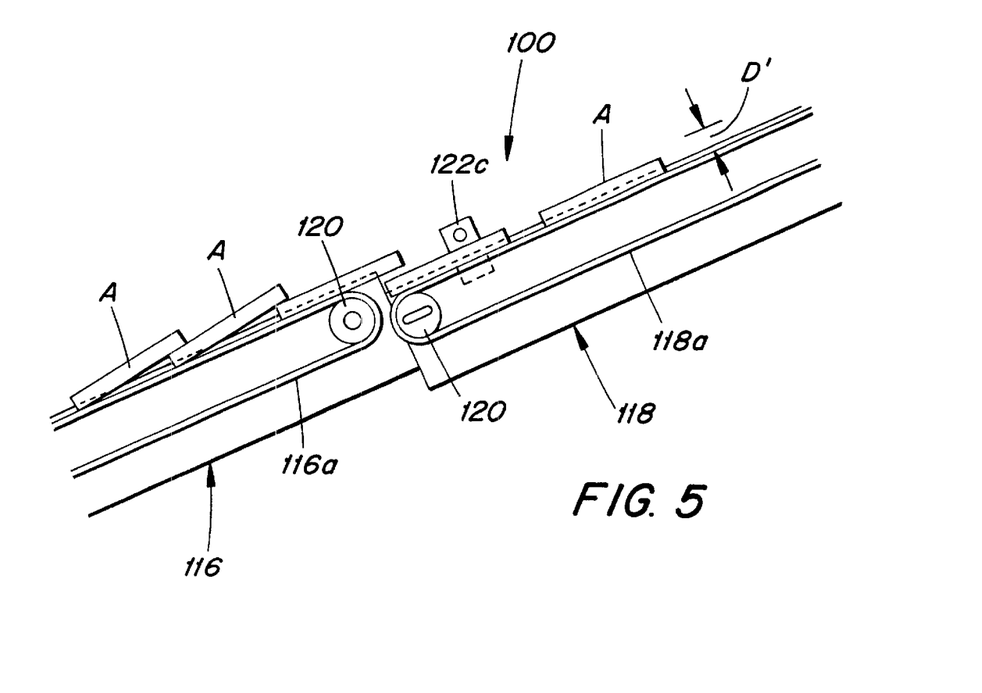
FIG. 5 is an enlarged fragmentary view of a junction between two inclined conveyors of FIG. 4.

Except for the first inclined conveyor 14a, each of the inclined conveyors 16a, 18a has an upstream end of its conveying surface offset downwardly by a distance D' with respect to a downstream end of the conveying surface of the preceding conveyor, i.e., offset in a direction requiring that the front or leading edge of each item A descend relative to its rear or trailing edge as the item is being transferred from the preceding conveyor to the succeeding conveyor, to facilitate separation of the items as will be discussed.

The magnitude of the offset distance D' can vary, although one preferred distance is equal to the radius of the downstream pulley.

The first inclined conveyor assembly 114 includes an infeed sensor 122a located adjacent an upstream end of the respective conveyor 114a for detecting the presence of items. That infeed sensor 122a is connected to the conveyor speed controller for providing a signal that controls the speed of the feed conveyor 112a as will be explained. The infeed sensor 122 could be of any suitable type, such as a photocell for example.

The angle of inclination β of the conveying surface of the first inclined conveyor 114a is chosen so that the items being conveyed will slide on top of each other but will not slide on the conveying surface. The optimum size of the angle β will depend on the coefficient of friction of the outer surface of the items A, but will usually lie in the range of 20–40 degrees. The conveying surfaces of the remaining inclined conveyors 116a, 118a are preferably, but not necessarily parallel to the conveying surface of the first inclined conveyor 114.

The general speed relationship of the inclined conveyors is such that each inclined conveyor travels faster than the preceding inclined conveyor. For lower throughputs, the relative conveying speeds could be fixed.

For higher throughputs, the relative conveying speeds could be variable, and controlled by a programmable logic device such as a PC or PLC. Each conveyor 116, 118 would then include a sensor 122b, 122c located near the upstream end thereof to check for the presence of items A. If items A are detected by such a sensor, then the speed of the respective conveyor would be set to a fraction of the speed of the next downstream conveyor. In this way, the speed would always be increasing for each consecutive belt in the series. This speed-increasing feature is utilized to pull the items apart (i.e., de-shingle the items) as they transfer from one conveyor to the next. For best functionality, a speed ratio of at least 2:1 is desired between consecutive conveyors. Typical speeds for the conveyors 114a, 116a, 118a would be 10, 20 and 40 feet per minute, respectively.

Likewise, the speed of the last inclined conveyor 118a is determined by the speed of the take-away conveyor 130 located immediately downstream from the inclined conveyor arrangement. In order to avoid the possibility of restacking the items, the last inclined conveyor should operate at a speed no greater than that of the take-away conveyor 30.

If no items are detected by sensors 122a, 122b, 122c, the inclined conveyors would then run at a maximum design speed. This maximizes the throughput by closing gaps in the item flow stream.

In operation, identical items A (e.g., magazines) are conveyed in a bulk stream on the transfer conveyor 30, at least some of the items being arranged in stacks. If the incline section 100 is not used in combination with a decline section 10, then the items A may be delivered to the incline section 100 in a more stacked condition than if a decline section 10 were being used. As a stack transfers onto the upstream end of the first inclined conveyor 114a, the stack will tilt rearwardly, causing the items to tend to slide rearwardly off one another and eventually assume a shingle orientation on the high-friction first inclined conveyor 114a, or possibly on one of the subsequent inclined conveyors, depending on the density of items being conveyed. In this shingle orientation, the leading end of an item is disposed atop a preceding item. Due to the high-friction of the conveying surface, the items will stay where they land on the conveying surface, but items disposed atop another item will continue to slide downwardly, thereby creating the shingle orientation.

It may be necessary to stop, or slow down, the transfer conveyor 30 to avoid re-stacking items on the first inclined conveyor 114a. As long as the infeed sensor 122a senses the presence of items, it will send a signal to the controller for stopping or slowing the transfer conveyor 30. Once the infeed sensor 122a no longer senses items, the transfer conveyor 30 will resume its normal speed.

As each item A reaches the second inclined conveyor 116a, its leading edge will drop down, due to the downwardly offset relationship of the conveying surface of the second inclined conveyor 116a relative to that of the first inclined conveyor 114a. This will free any loose debris, such as paperclips, staples, rubber bands, etc., trapped beneath the items, enabling the debris to fall through a gap disposed between the conveyors 114a, 116a.

Also, the descent of an item's leading edge brings the underside of the item into surface contact with the high-friction second inclined conveyor 116a. Since the item's trailing edge still rests on the low-friction item trailing therebehind, and since the downstream conveyor 116a is traveling faster than (e.g., twice as fast as) the upstream conveyor 114a, the leading item is pulled forwardly relative to the trailing item. Depending upon the magnitude of the speed difference, the leading item can be completely or partially pulled off the trailing item. If only partially pulled off the trailing item, the leading item will be further separated from the trailing item by subsequent one(s) of the inclined conveyors until completely separated from the trailing item.

As noted earlier, in a situation where a high volume of items is being conveyed, it may be desired to slow the speeds of the inclined conveyors by using the sensors 122a, 122b, 122c. If those sensors detect items, then the speed of the respective conveyor would be reduced, as well as the speeds of all conveyors disposed downstream thereof, while maintaining the relationship wherein the speed of each downstream conveyor is greater than the speed of the previous conveyor.

If a sensor 122a, 122b, or 122c does not detect items, then the conveyor speeds return to their maximums, but wherein each inclined conveyor travels faster than the previous inclined conveyor.

By combining both the decline section 10 and the incline section 100, a more effective unstacking is achieved than if only one of the sections 10, 100 were used.

Although the present invention has been described in connection with a preferred embodiment thereof, it will be appreciated by those skilled in the art that additions, deletions, modifications and substitutions not specifically described may be made without departing from the spirit and scope of the invention as defined in the appended claims.

What is claimed is:

1. A decline unstacking apparatus comprising:
   a feed conveyor for feeding stacks of items; and
   a declined conveyor arrangement including at least first and second declined conveyors arranged in series, and each including a declined upstream end, the first declined conveyor having its declined upstream end disposed at a discharge end of the feed conveyor, the first declined conveyor being declined from its upstream end at an angle relative to a direction of travel of the feed conveyor whereby a stack being discharged from the discharge end tilts forwardly and causes the items in the stack to slide forwardly off one another into a shingle arrangement on the first declined conveyor, wherein the leading end of an item is situated beneath the trailing end of a preceding item, the second declined conveyor having its declined upstream end disposed adjacent the downstream end of the first declined conveyor and traveling at a faster speed than the first declined conveyor for at least partially de-shingling the items received from the first declined conveyor.

2. The decline unstacking apparatus according to claim 1 further comprising a sensor for sensing items on the first declined conveyor; and a controller for controlling a speed of the feed conveyor in response to signals from the sensor, for preventing the discharge of additional items onto the first declined conveyor until there is sufficient space on the first declined conveyor for receiving additional items.

3. The decline unstacking apparatus according to claim 2 wherein the sensor comprises a first sensor, and further including a second sensor for sensing items on the first declined conveyor, the second sensor disposed downstream of the first sensor and connected to the controller for regulating a speed of the second declined conveyor in accordance with signals from the second sensor.

4. The decline unstacking apparatus according to claim 1 wherein an upstream end of a conveying surface defined by the second declined conveyor is offset upwardly with respect to a path of travel of a conveying surface defined by a downstream end of the first declined conveyor, causing a downstream end of each item to be raised when passing from the first declined conveyor to the second declined conveyor.

5. The decline unstacking apparatus according to claim 4 wherein the downstream end of the first declined conveyor and the upstream end of the second declined conveyor travel around respective first and second support pulleys, the upstream end of the conveying surface defined by the second declined conveyor being offset from the path of travel of the downstream end of the conveying surface defined by the first declined conveyor by a distance equal substantially to a radius of the second support pulley.

6. The decline unstacking apparatus according to claim 1 wherein the declined conveyor arrangement includes at least three declined conveyors arranged in series.

7. The decline stacking apparatus according to claim 1 wherein the first and second declined conveyors comprise endless belts.

8. An incline unstacking apparatus comprising:
   a feed conveyor for feeding stacks of items;
   an inclined conveyor arrangement including at least first and second inclined conveyors arranged in series, a first of the inclined conveyors having an upstream end disposed at a discharge end of the feed conveyor, the first inclined conveyor being inclined from its upstream end at an angle relative to a direction of travel of the feed conveyor whereby a stack being discharged from the discharge end tilts forwardly, causing the items in the stack to slide forwardly off one another into a shingle arrangement on the first inclined conveyor, wherein the leading end of an item rests upon the trailing end of a preceding item;

the second inclined conveyor including an upstream end disposed adjacent a downstream end of the first inclined conveyor and traveling at a faster speed than the first inclined conveyor for at least partially de-shingling the items received from the first inclined conveyor;

an upstream end of a conveying surface defined by the second inclined conveyor being offset upwardly with respect to a path of travel of a downstream end of a conveying surface defined by the first inclined conveyor, causing a downstream end of each item to descend when passing from the first inclined conveyor to the second inclined conveyor;

a sensor for sensing items on the first inclined conveyor; and a controller for regulating a speed of the second inclined conveyor in response to a signal from the sensor, while always maintaining a speed of the second downstream conveyor greater than a speed of the first inclined conveyor.

9. A decline unstacking apparatus comprising:

a feed conveyor for feeding stacks of items;

a declined conveyor arrangement including at least first and second declined conveyors arranged in series, a first of the declined conveyors having an upstream end disposed at a discharge end of the feed conveyor, the first declined conveyor being declined from its upstream end at an angle relative to a direction of travel of the feed conveyor whereby a stack being discharged from the discharge end tilts forwardly, causing the items in the stack to slide forwardly off one another into a shingle arrangement on the first declined conveyor, wherein the leading end of an item is situated beneath the trailing end of a preceding item;

the second declined conveyor including an upstream end disposed adjacent a downstream end of the first declined conveyor and traveling at a faster speed than the first declined conveyor for at least partially de-shingling the items received from the first declined conveyor;

an upstream end of a conveying surface defined by the second declined conveyor being offset upwardly with respect to a path of travel of a downstream end of a conveying surface defined by the first declined conveyor, causing a downstream end of each item to be raised when passing from the first declined conveyor to the second declined conveyor;

a sensor for sensing items on the first declined conveyor; and a controller for regulating a speed of the second declined conveyor in response to a signal from the sensor, while always maintaining a speed of the second downstream conveyor greater than a speed of the first declined conveyor.

10. A method of unstacking items fed in stacked relationship in a bulk stream, comprising the steps of:

A) feeding the stream along a feed conveyor to an upstream end of a declined conveyor arrangement comprising at least first and second declined conveyors arranged in series, whereby a stack of items tilts forwardly as it reaches an upstream end of the first declined conveyor, causing the items to slide forwardly off one another into a shingle arrangement on the first declined conveyor, wherein the leading end of an item is situated beneath the trailing end of a preceding item;

B) conveying the items continuously downwardly on the first declined conveyor to the second declined conveyor; and C) driving the second declined conveyor at a faster speed than the first declined conveyor whereby the second declined conveyor at least partially de-shingles the items received from the first declined conveyor.

11. The method according to claim 10, further comprising the steps of sensing items on the first declined conveyor; and regulating a speed of the feed conveyor in response to signals from the sensor, to prevent the discharge of additional items onto the first declined conveyor until there is sufficient space on the first declined conveyor for receiving additional items.

12. The method according to claim 11 wherein the sensing step comprises a first sensing step, the method further comprising a second sensing step of sensing items on the first declined conveyor at a location spaced downstream of the first sensing step, and regulating a speed of the second declined conveyor in accordance with signals from the second sensing step while always driving the second declined conveyor faster than the first declined conveyor.

13. The method according to claim 10, further comprising the step of raising a leading end of each item relative to a trailing end of the item when passing the item from the first declined conveyor to the second declined conveyor.

14. An incline unstacking apparatus comprising:

a feed conveyor for feeding stacks of items; and an inclined conveyor arrangement including at least first and second continuously moving inclined, conveyors arranged in series, the first inclined conveyor having an upstream end disposed at a discharge end of the feed conveyor, the first inclined conveyor being inclined from its upstream end at an angle relative to a direction of travel of the feed conveyor whereby a stack being discharged from the discharge end tilts rearwardly and causes the items in the stack to slide rearwardly off one another into a shingle arrangement on the first inclined conveyor, wherein the leading end of an item rests upon the trailing end of a preceding item, the second inclined conveyor including an upstream end disposed adjacent a downstream end of the first inclined conveyor and traveling at a faster speed than the first inclined conveyor for at least partially de-shingling the items received from the first inclined conveyor.

15. The incline unstacking apparatus according to claim 14 further comprising a sensor for sensing items on the first inclined conveyor; and a controller for controlling a speed of the feed conveyor in response to signals from the sensor, for preventing the discharge of additional items onto the first inclined conveyor until there is sufficient space on the first inclined conveyor for receiving additional items.

16. The incline unstacking apparatus according to claim 15 wherein the sensor comprises a first sensor, and further including a second sensor for sensing items on the first inclined conveyor, the second sensor disposed downstream of the first sensor and connected to the controller for regulating a speed of the second inclined conveyor in accordance with signals from the second sensor.

17. The incline unstacking apparatus according to claim 14 wherein the downstream end of the first inclined conveyor and the upstream end of the second inclined conveyor travel around respective first and second support pulleys, the upstream end of the conveying surface defined by the second inclined conveyor being offset from the path of travel of the downstream end of the conveying surface defined by the first inclined conveyor by a distance equal substantially to a radius of the second support pulley.

18. The incline unstacking apparatus according to claim 14 wherein an upstream end of a conveying surface defined by the second inclined conveyor is offset downwardly with respect to a path of travel of a conveying surface defined by a downstream end of the first inclined conveyor, causing a downstream end of each item to descend when passing from the first inclined conveyor to the second inclined conveyor.

19. The incline unstacking apparatus according to claim 14 wherein the inclined conveyor arrangement includes at least three inclined conveyors arranged in series.

20. The incline stacking apparatus according to claim 14 wherein the first and second inclined conveyors comprise endless belts.

21. An unstacking apparatus comprising a decline unstacking section, an incline unstacking section, and a transfer conveyor for transferring items from the decline unstacking section to the incline unstacking section, the decline unstacking section comprising:

a feed conveyor for feeding stacks of items, and a declined conveyor arrangement including at least first and second declined conveyors arranged in series, a first of the declined conveyors having an upstream end disposed at a discharge end of the feed conveyor, the first declined conveyor being declined from its upstream end at an angle relative to a direction of travel of the feed conveyor whereby a stack being discharged from the discharge end tilts forwardly, causing the items in the stack to slide forwardly off one another into a shingle arrangement on the first declined conveyor, wherein the leading end of an item is situated beneath the trailing end of a preceding item;

the incline unstacking section comprising:

an inclined conveyor arrangement including at least first and second inclined conveyors arranged in series, a first of the inclined conveyors having an upstream end arranged to receive items that have traveled through the decline unstacking section, the first inclined conveyor being inclined from its upstream end at an angle relative to a direction of travel of the feed conveyor whereby a stack being discharged from the discharge end tilts rearwardly and causes the items in the stack to slide rearwardly off one another into a shingle arrangement on the first inclined conveyor, wherein the leading end of an item rests upon the trailing end of a preceding item, the second inclined conveyor including an upstream end disposed adjacent a downstream end of the first inclined conveyor and traveling at a faster speed than the first inclined conveyor for at least partially de-shingling the items received from the first inclined conveyor.

22. A method of unstacking items fed in stacked relationship in a bulk stream, comprising the steps of:

A) feeding the stream along a feed conveyor to an upstream end of a declined conveyor arrangement comprising at least first and second declined conveyors arranged in series, whereby a stack of items tilts forwardly as it reaches an upstream end of the first declined conveyor, causing the items to slide forwardly off one another into a shingle arrangement on the first declined conveyor, wherein the leading end of an item is situated beneath the trailing end of a preceding item;

B) driving the second declined conveyor at a faster speed than the first declined conveyor whereby the second declined conveyor at least partially de-shingles the items received from the first declined conveyor;

C) feeding the stream exiting the declined conveyor arrangement to an upstream end of an inclined conveyor arrangement comprising at least first and second inclined conveyors arranged in series, whereby a stack of items tilts forwardly as it reaches an upstream end of the first inclined conveyor, causing the items to slide off one another into a shingle arrangement on the first inclined conveyor, wherein the leading end of an item rests upon the trailing end of a preceding item; and D) driving the second inclined conveyor at a faster speed than the first inclined conveyor whereby the second inclined conveyor at least partially de-shingles the items received from the first inclined conveyor.

23. A method of unstacking items fed in stacked relationship in a bulk stream, comprising the steps of:

A) feeding the stream along a feed conveyor to an upstream end of an inclined conveyor arrangement comprising at least first and second continuously moving inclined conveyors arranged in series, whereby a stack of items tilts forwardly as it reaches an upstream end of the first inclined conveyor, causing the items to slide forwardly off one another into a shingle arrangement on the first inclined conveyor, wherein the leading end of an item rests upon the trailing end of a preceding item; and B) driving the second inclined conveyor at a faster speed than the first inclined conveyor whereby the second inclined conveyor at least partially deshingles the items received from the first inclined conveyor.

24. The method according to claim 23, further comprising the steps of sensing items on the first inclined conveyor; and regulating a speed of the feed conveyor in response to signals from the sensor, to prevent the discharge of additional items onto the first inclined conveyor until there is sufficient space on the first inclined conveyor for receiving additional items.

25. The method according to claim 24 wherein the sensing step comprises a first sensing step, the method further comprising a second sensing step of sensing items on the first inclined conveyor at a location spaced downstream of the first sensing step, and regulating a speed of the second inclined conveyor in accordance with signals from the second sensing step while always driving the second inclined conveyor faster than the first inclined conveyor.

26. The method according to claim 23, further comprising the step of passing a leading end of each item across a downward step when passing the item from the first inclined conveyor to the second inclined conveyor.

27. A decline unstacking apparatus comprising:

a feed conveyor for feeding stacks of items; and a declined conveyor arrangement including at least first and second declined conveyors arranged in series, a first of the declined conveyors having an upstream end disposed at a discharge end of the feed conveyor, the first declined conveyor being declined from its upstream end at an angle relative to a direction of travel of the feed conveyor whereby a stack being discharged from the discharge end tilts forwardly and causes the items in the stack to slide forwardly off one another into a shingle arrangement on the first declined conveyor, wherein the leading end of an item is situated beneath the trailing end of a preceding item, the second declined conveyor including an upstream end disposed adjacent a downstream end of the first declined conveyor and traveling at a faster speed than the first declined conveyor for at least partially de-shingling the items received from the first declined conveyor;

wherein an upstream end of a conveying surface defined by the second declined conveyor is offset upwardly with respect to a path of travel of a conveying surface defined by a downstream end of the first declined conveyor, causing a downstream end of each item to be raised when passing from the first declined conveyor to the second declined conveyor, the downstream end of the first declined conveyor and the upstream end of the second declined conveyor traveling around respective first and second support pulleys, the upstream end of the conveying surface defined by the second declined conveyor being offset from the path of travel of the downstream end of the conveying surface defined by the first declined conveyor by a distance equal substantially to a radius of the second support pulley.

28. A method of unstacking items fed in stacked relationship in a bulk stream, comprising the steps of:

A) feeding the stream along a feed conveyor to an upstream end of a declined conveyor arrangement comprising at least first and second declined conveyors arranged in series, whereby a stack of items tilts forwardly as it reaches an upstream end of the first declined conveyor, causing the items to slide forwardly off one another into a shingle arrangement on the first declined conveyor, wherein the leading end of an item is situated beneath the trailing end of a preceding item;

B) driving the second declined conveyor at a faster speed than the first declined conveyor whereby the second declined conveyor at least partially de-shingles the items received from the first declined conveyor;

C) sensing items at a first location on the first declined conveyor with a first sensor, and regulating a speed of the feed conveyor in response to signals from the first sensor, to prevent the discharge of additional items onto the first declined conveyor until there is sufficient space on the first declined conveyor for receiving additional items; and D) sensing items on the first declined conveyor with a second sensor at a location spaced downstream of the first sensor, and regulating a speed of the second declined conveyor in accordance with signals from the second sensor while always driving the second declined conveyor faster than the first declined conveyor.

29. An incline unstacking apparatus comprising:
a feed conveyor for feeding stacks of items; and an inclined conveyor arrangement including at least first and second inclined conveyors arranged in series, a first of the inclined conveyors having an upstream end disposed at a discharge end of the feed conveyor, the first inclined conveyor being inclined from its upstream end at an angle relative to a direction of travel of the feed conveyor whereby a stack being discharged from the discharge end tilts rearwardly and causes the items in the stack to slide rearwardly off one another into a shingle arrangement on the first inclined conveyor, wherein the leading end of an item rests upon the trailing end of a preceding item, the second inclined conveyor including an upstream end disposed adjacent a downstream end of the first inclined conveyor and traveling at a faster speed than the first inclined conveyor for at least partially de-shingling the items received from the first inclined conveyor, wherein an upstream end of a conveying surface defined by the second inclined conveyor is offset downwardly with respect to a path of travel of a conveying surface defined by a downstream end of the first inclined conveyor, causing a downstream end of each item to descend when passing from the first inclined conveyor to the second inclined conveyor.

30. A method of unstacking items fed in stacked relationship in a bulk stream, comprising the steps of:

A) feeding the stream along a feed conveyor to an upstream end of an inclined conveyor arrangement comprising at least first and second inclined conveyors arranged in series, whereby a stack of items tilts forwardly as it reaches an upstream end of the first inclined conveyor, causing the items to slide forwardly off one another into a shingle arrangement on the first inclined conveyor, wherein the leading end of an item rests upon the trailing end of a preceding item;

B) driving the second inclined conveyor at a faster speed than the first inclined conveyor whereby the second inclined conveyor at least partially de-shingles the items received from the first inclined conveyor;

C) sensing items at a first location on the first inclined conveyor with a first sensor, and regulating a speed of the feed conveyor in response to signals from the first sensor, to prevent the discharge of additional items onto the first inclined conveyor until there is sufficient space on the first inclined conveyor for receiving additional items; and D) sensing items on the first inclined conveyor with a second sensor at a location spaced downstream of the first sensor, and regulating a speed of the second inclined conveyor in accordance with signals from the second sensor while always driving the second inclined conveyor faster than the first inclined conveyor.

* * * * *